US 7,593,035 B2

(12) United States Patent
Okamoto (10) Patent No.: US 7,593,035 B2
(45) Date of Patent: Sep. 22, 2009

(54) IMAGE DATA TRANSMITTING DEVICE AND METHOD (75) Inventor: Satoshi Okamoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 639 days.

(21) Appl. No.: 09/833,649

(22) Filed: Apr. 13, 2001

(65) Prior Publication Data
US 2002/0021359 A1 Feb. 21, 2002

(30) Foreign Application Priority Data
Apr. 14, 2000 (JP) ............................. 2000-113379

(51) Int. Cl.
H04N 5/225 (2006.01)
(52) U.S. Cl. ............. 348/207.1; 348/207.2; 348/207.11
(58) Field of Classification Search .............. 348/211.1, 348/211.2, 211.3, 207.99, 207.11, 207.2, 348/552, 333.05, 333.01, 207.1, 222.1, 231.3, 348/14.01, 14.02, 14.12; 455/566
See application file for complete search history.

(56) References Cited

U.S. PATENT DOCUMENTS

| 5,555,100 | A | * | 9/1996 | Bloomfield et al. ......... 358/402 |
| 5,724,579 | A | * | 3/1998 | Suzuki ..................... 707/104.1 |
| 5,737,491 | A | * | 4/1998 | Allen et al. ................. 704/270 |
| 5,806,005 | A | * | 9/1998 | Hull et al. .................... 455/566 |
| 5,917,542 | A | * | 6/1999 | Moghadam et al. ..... 348/231.99 |
| 6,188,431 | B1 | * | 2/2001 | Oie .......................... 348/211.5 |
| 6,230,187 | B1 | | 5/2001 | Suzuki |
| 6,263,106 | B1 | * | 7/2001 | Yamagata .................... 382/232 |
| 6,297,870 | B1 | * | 10/2001 | Nanba .......................... 355/18 |
| 6,522,354 | B1 | * | 2/2003 | Kawamura et al. ....... 348/231.2 |
| 6,535,298 | B2 | * | 3/2003 | Winter et al. ............... 358/1.16 |
| 6,545,687 | B2 | * | 4/2003 | Scott et al. ................... 345/629 |
| 6,618,553 | B1 | * | 9/2003 | Shiohara ...................... 386/117 |
| 6,628,325 | B1 | * | 9/2003 | Steinberg et al. ......... 348/211.1 |
| 6,734,909 | B1 | * | 5/2004 | Terane et al. ........... 348/333.05 |
| 6,784,925 | B1 | * | 8/2004 | Tomat et al. ............ 348/207.11 |
| 6,967,675 | B1 | * | 11/2005 | Ito et al. ................... 348/207.1 |
| 6,977,680 | B1 | * | 12/2005 | Ichihara ................. 348/231.99 |
| 2002/0101440 | A1 | * | 8/2002 | Niikawa et al. ............. 345/698 |
| 2003/0009469 | A1 | * | 1/2003 | Platt et al. .................... 707/100 |
| 2003/0138143 | A1 | * | 7/2003 | Noguchi ...................... 382/167 |

FOREIGN PATENT DOCUMENTS

| JP | 09-37125 | * | 2/1997 |
| JP | 937125 | | 2/1997 |
| JP | 10-243329 A | | 9/1998 |
| JP | 10-336574 A | | 12/1998 |
| JP | 11-136612 A | | 5/1999 |
| JP | 11-296462 A | | 10/1999 |
| JP | 11-313237 A | | 11/1999 |
| JP | 2000-78379 A | | 3/2000 |
| JP | 2000-341619 A | | 12/2000 |

* cited by examiner

Primary Examiner—Sinh Tran
Assistant Examiner—Yogesh K Aggarwal
(74) Attorney, Agent, or Firm—Birch, Stewart, Kolasch & Birch, LLP (57) ABSTRACT An image data transmitting device comprises a communication device and an information processing device. The communication device that transmits main image data stored in a storage medium to an external apparatus. The information processing device that deletes the main image data stored in the storage medium after the communication device transmits it. The information processing device produces reduced image data of the main image data and stores the reduced image data in the storage medium, or keeps reduced image data of the main image data stored in the storage medium. This makes it easy for the user to recognize the image after the main image data has been transmitted.

61 Claims, 10 Drawing Sheets

| AUTOTRAN.MRK | TRANSMISSION INFORMATION FILE | 88 |
|---|---|---|
| General Information | Version information of transmission file, information on electronic camera, and date and time of production | |
| User Information | name, address, and telephone number of user | |
| Print Job Information | print ID, number of prints, print size, and information on index print | |
| Image Source Information | recording format for image files, and file names | |
| Setting Information | letters(date and title) to be printed on prints, and information on trimming and printing direction | |
| Communication Apparatus Information | names of files to be deleted after transmission, and name, manufacturer and serial number of external apparatus to which image files are to be transmitted | |

| TAG INFORMATION | | | | |
|---|---|---|---|---|
| Shooting Date and Time | 12/14/99 12:31:10 | | | |
| Shooting Mode :NORMAL | | | | |
| Title : "VACATION" | | | | |
| White Balance :AUTO | | | | |
| Focus :MANUAL | | | | |
| Location :UNKNOWN | | | | |
| Electronic Flash :OFF | | | | |
| ⋮ | | | | |
| To : Printer A | | A1 | 1 | Un-transmitted |

THUMBNAIL DATA (160×120)

MAIN IMAGE DATA (1024×768 or 640×480)

FIG. 10

| AUTPRINT.MRK | TRANSMISSION INFORMATION FILE |
|---|---|

2000:10:10

DSC 4700Z

| Files To Be Transmitted | To | Transmitted or Untransmitted | Number Of Prints | Print Size |
|---|---|---|---|---|
| DSCF0001.JPG | Server | ○ | — | — |
| DSCF0002.JPG | Server | × | — | — |
| DSCF0003.JPG | Printer A | × | 2 | 90 × 125 |
| . | . | | | |
| . | . | | | |
| . | . | | | |
| . | . | | | |
| DSCF0050.JPG | Printer A | × | 1 | A4 |

IMAGE DATA TRANSMITTING DEVICE AND METHOD

BACKGROUND OF THE INVENTION

1. Field of the Invention

The present invention relates to an image data transmitting device and an image data transmitting method, and more particularly to an image data transmitting device that transmits main image data to an external communication apparatus, and an image data transmitting method.

2. Description of Related Art

Japanese Patent Application Laid-Open No. 9-37125 discloses a camera that temporarily stores image data captured electronically in a storage device and transmits the image data to an external apparatus. This camera can capture the image data when a power switch is on, and it can transmit the image data only when the power switch is off.

However, the camera transmits the image data as long as a battery is not exhausted. In addition, if the image data stored in the camera is deleted after the transmission, the user can not recognize the image.

SUMMARY OF THE INVENTION

The present invention has been achieved in view of these circumstances and it is an object of the present invention to provide an image data transmitting device and an image data transmitting method in which a user can easily recognize an image after image data has been transmitted.

For attaining the above described objects, the present invention is directed to an image data transmitting device, comprising: a communication device that transmits main image data stored in a storage medium to an external apparatus; and an information processing device that deletes the main image data stored in the storage medium after the communication device transmits the main image data, and that keeps reduced image data of the main image data stored in the storage medium.

The present invention is also directed to an image data transmitting method, comprising the steps of: transmitting main image data stored in a storage medium to an external apparatus; and deleting the main image data stored in the storage medium after the main image data is transmitted, while keeping reduced image data of the main image data stored in the storage medium.

According to the present invention, it is easy for the user to recognize the image after the main image data has been transmitted.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A preferred embodiment according to the present invention will be described in detail hereinafter referring to the accompanying drawings.

Figure 1:
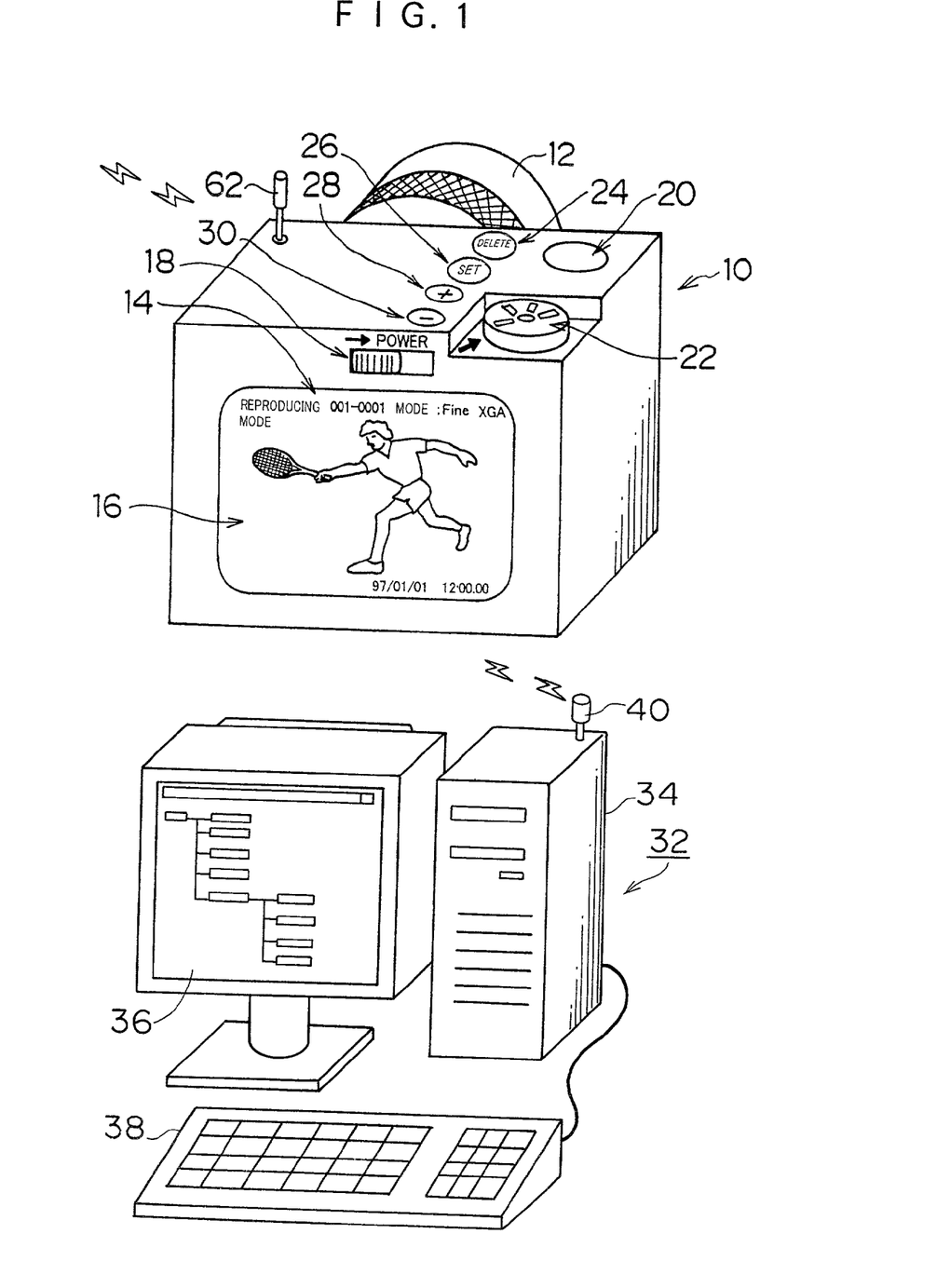
FIG. 1 is an external perspective view of an electronic camera and a server that can communicate with the electronic camera.

FIG. 1 is an external perspective view of an electronic camera 10 (an image data transmitting device) and a server 32 (an information storage device) that can communicate with the electronic camera 10.

The electronic camera 10 comprises an imaging lens 12 that forms a subject image on an imaging device; a display 16 that displays a frame number 14, an image, a message that the camera 10 is transmitting image data, and so on; a power switch 18; a shutter release button 20 for capturing an image; a mode selector 22 for selecting a mode, a delete button 24 for deleting an item displayed on the display 16; a set button 26 for setting a desired item (permission to erase information stored in a storage medium, prohibition against the erasure, etc.) displayed on the display 16; an increment button 28 for increasing the frame number or the like displayed on the display 16; and a decrement button 30 for decreasing the frame number or the like displayed on the display 16.

The electronic camera 10 also has an antenna 62 that transmits and receives a carrier wave and data to/from an external communication apparatus such as the server 32.

The server 32 can receive information from the electronic camera 10 and store it in a storage medium with a large capacity. The server 32 comprises an antenna 40 that transmits and receives information; a computer 34 that has the storage medium such as a hard disc and an information processing device including a CPU; a display 36; and an input device 38 such as a keyboard. The server 32 may store an electronic image album and so on, and it may be a printer that prints an image of received data.

Figure 2:
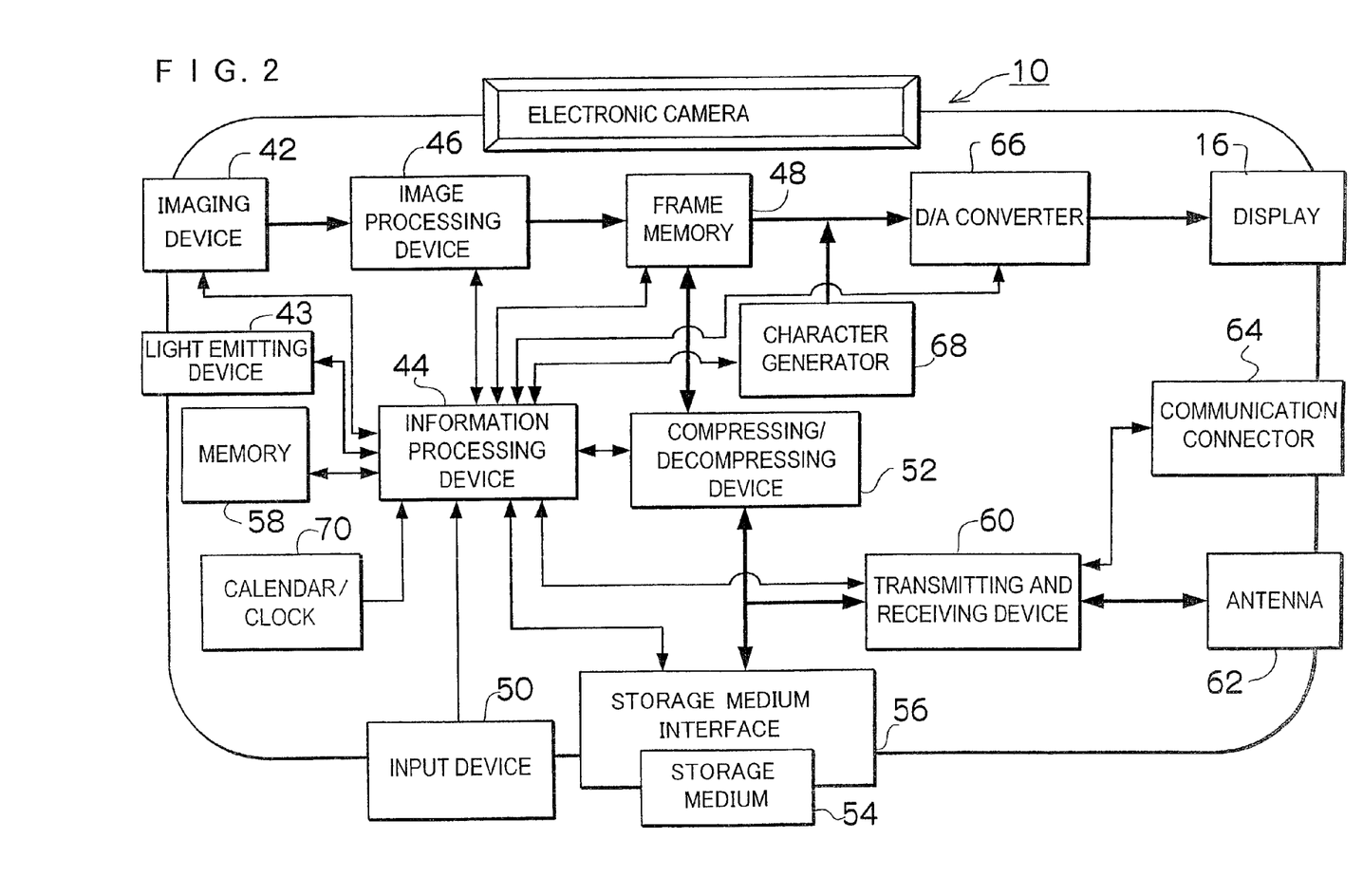
FIG. 2 is a block diagram showing a structure of the electronic camera.

FIG. 2 is a block diagram showing a structure of the electronic camera 10.

The electronic camera 10 is provided with the imaging device 42 that forms the subject image on a light-receiving surface to perform a photo-electronic conversion and outputs the converted image data, and a light-emission device 43 that emits a light to illuminate the subject. The imaging device 42 includes a focus adjusting device that focuses the lens on the subject, an aperture adjusting part that adjusts an aperture, a shutter speed adjusting device that adjusts an exposure time and a zoom adjusting device that adjusts a view angle.

The electronic camera 10 is provided with an information processing device 44 that controls the entire camera 10, and controls the sampling timing of image data, the light-emission device 43, the exposure, the focus, the zoom, storage of image data, communication and display, and performs white balance setting, conversion of image data, setting or canceling of a power save mode, instructions for the storage medium 54 to store or delete information, and instructions for a storage medium interface 56 to permit or prohibit deleting a file stored in the storage medium 54.

A memory 58 is connected to the information processing device 44, and the memory 58 is composed of a ROM that stores programs for the electronic camera 10, various constants, parameters indicating imaging conditions and properties of images, and so on, and a RAM for operations while the programs are executed.

Further, the electronic camera 10 is provided with an image processing device 46 that performs changing of the number of pixels, sharpness correction, gamma correction, contrast correction, white balance correction, etc.; a frame memory 48 that temporarily stores image data; an input device 50 including the shutter release button 20, the deleting button 24, the set button 26, the increment button 28, the decrement button 30; and a compressing and decompressing device 52 that compresses information such as image data in a format including the JPEG and MPEG and decompresses the compressed data in accordance with instructions of the information processing device 44.

The electronic camera 10 also has the storage medium interface 56 that converts data to store or read the data in/from a detachable storage medium 54 and stores information on whether to permit or prohibit deleting the information stored in the storage medium 54 in a predetermined area of the storage medium 54. The storage medium 54 is a memory card, an MO or the like, that uses semiconductors, magnetic recording and optical recording.

A wireless communication device of the electronic camera 10 that communicates with the external apparatus comprises a transmitting and receiving device 60 (communication device) that encodes data before transmitting it or decodes data after receiving it in accordance with instructions of the information processing device 44, the antenna 62 for transmitting and receiving the carrier wave and the data, and a communication connector 64 for connecting the electronic camera 10 to the external apparatus through a cable to perform wire communication.

Information stored in the storage medium 54, the RAM, the ROM and the frame memory 48 can be transmitted to the external apparatus through the communication device, and information can be received from the external apparatus through the communication device to be stored in them. A light such as an infrared light may be used for the wireless communication instead of the radio wave, and the wire communication may be performed with the cable.

In case of the wire communication, the information is converted into electric signals or optical signals, which is transmitted through the cable.

Furthermore, the electronic camera 10 is provided with a display 16 that displays the message that the information is being transmitted to the external apparatus, the main image and a thumbnail (reduced image); a D/A converter 66 that converts data into data for display; a character generator 68 that converts code information from the information processing device 44 into character data for display; and a calendar and clock 70 that shows the date and time.

Figure 3:
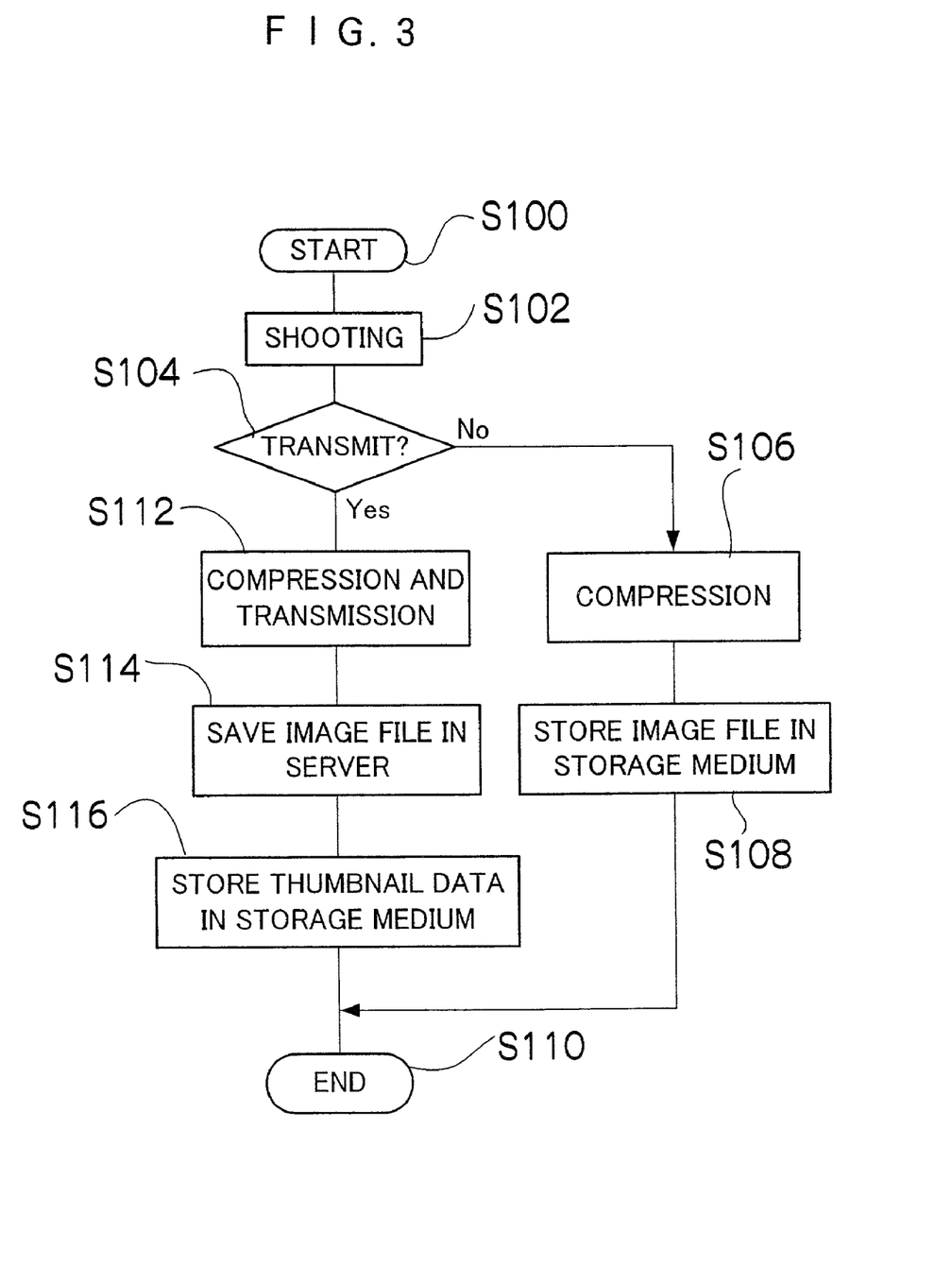
FIG. 3 is a flowchart showing imaging processing of the electronic camera.

The imaging processing of the electronic camera 10 will now be explained with reference to a flowchart in FIG. 3.

When the user pushes the shutter release button 20 of the input device 50 or instructs the camera 10 to capture the image through the communication device, the program for the information processing device 44 goes to S100 of "START." Then, the program goes to S102 of "SHOOTING" to perform shooting under designated exposure conditions, light-emission conditions, zooming conditions and focusing conditions and photo-electrically convert the subject image formed on the light-receiving surface of the imaging device 42 into the image data.

The image processing device 46 amplifies the image data, reduces noise, adjusts the white balance and converts the data into image data with different resolution (the number of pixels). Then, the processed image data is temporarily stored in the frame memory 48.

At S104 of "TRANSMIT?," whether a mode for transmitting the image data to the external apparatus has been selected is determined. If a mode for storing the image data in the storage medium 54 has been selected, then the program goes to S106 of "COMPRESSION."

At S106, the image data is transmitted from the frame memory 48 to the compressing and decompressing device 52, which compresses the image data in a predetermined format. The compressed image data is transmitted to the storage medium interface 56 and stored in the storage medium 54 at S108 of "STORE IMAGE FILE IN STORAGE MEDIUM." Then, the program goes to S110 of "END" to finish the processing. Tag information (attached information) (the shooting date, the shooting mode, the title, etc.) and reduced image data (thumbnail data) may be stored in an image file with the main image data.

If the mode for transmitting the image data to the external apparatus has been selected at S104, then the program goes to S112 of "COMPRESSION AND TRANSMISSION." At S112, the image data stored in the frame memory 48 is transmitted to the compressing and decompressing device 52, which compresses the image data in the predetermined format. The compressed image data is transmitted to the transmitting and receiving device 60. The image file including the main image data is transmitted from the transmitting and receiving device 60 to the server 32 through the antenna 62 and the communication connector 64.

During the transmission, the display of the server 32 may display the massage that the image file is being transmitted. An image file is generally large, and the transmission takes several minutes to tens of minutes. If any message is not displayed during that time, the user can mistakenly turn off the power switch of the server 32 and cut the communication. The message prevents such a mistake.

At S114 of "SAVE IMAGE FILE IN SERVER," the received image file is stored in the storage medium such as the hard disc in the computer 34 of the server 32. After that, at S116 of "STORE THUMBNAIL DATA IN STORAGE MEDIUM," the thumbnail data is produced and stored in the storage medium 54. Information (characters or a mark) that indicates the image file has been transmitted is added to the thumbnail. An indicator indicating that the image file has been transmitted to the server 32 may be added to the file name, and information indicating that may be added to the tag information of the image file.

The thumbnail data has, for example, 160×120 pixels. In case the thumbnail data has been stored in the image file (for example, in the Exif format that is widely used for electronic cameras), only the main image data may be deleted to keep the thumbnail data. In this case, information that indicates that the main image data has been deleted is added to the tag information.

After the thumbnail data is stored in the storage medium 54, the program goes to S110 of "END" to finish the processing.

Image data is captured in a transmission mode when the image data is to be transmitted manually to the external apparatus. Then, the user pushes a transmission button, and the information processing device 44 reads the image data from the storage medium 54 or the frame memory 48. The information processing device 44 compresses the image data, and the transmitting and receiving device 60 transmits the compressed data to the external apparatus through the antenna 62 or the communication connector 64.

When image data stored in the storage medium 54 is to be transmitted to the server 32 automatically, an automatic transmission mode is selected. When the electronic camera 10 and the server 32 get into a communication area, they automatically start the communication.

Figure 4:
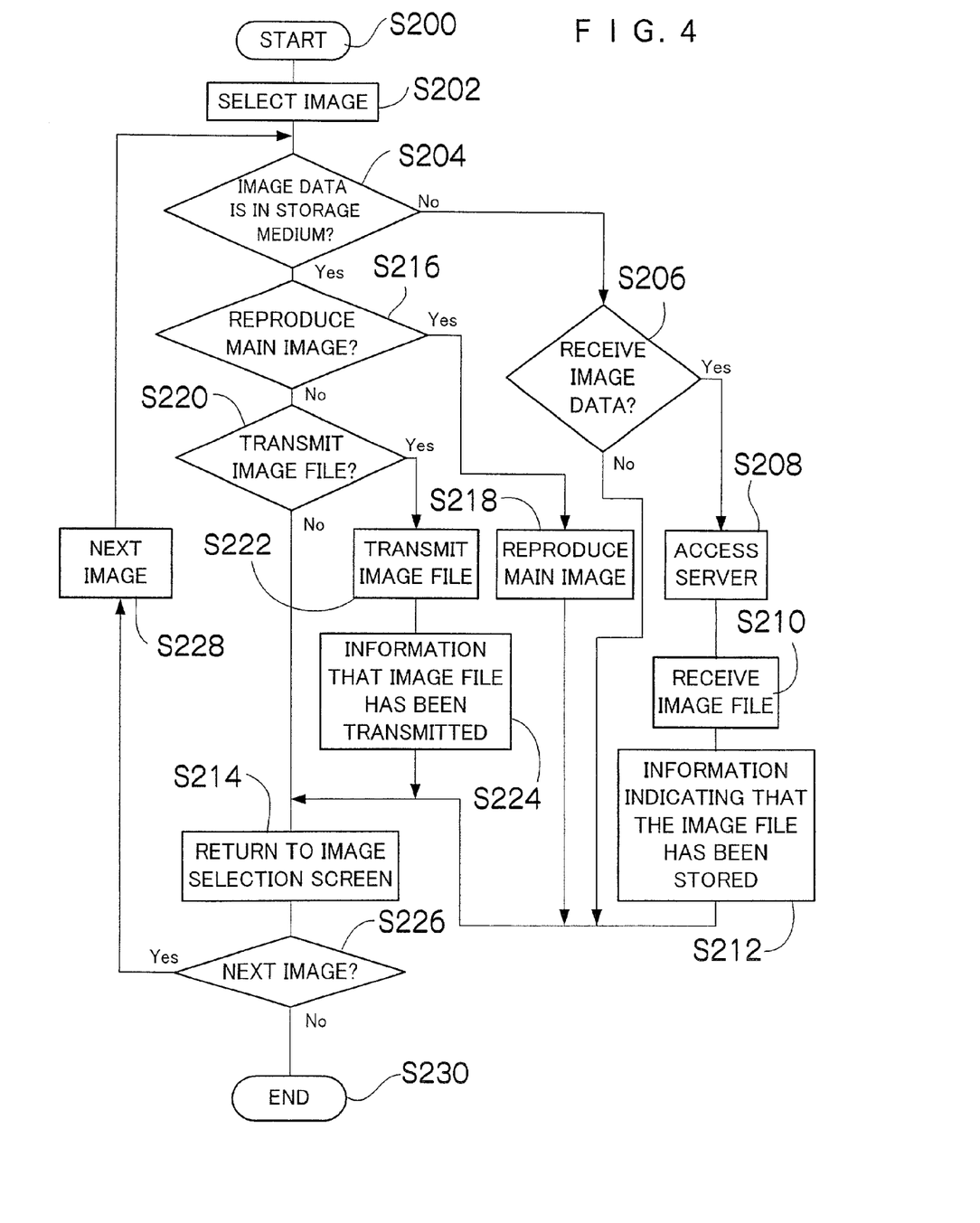
FIG. 4 is a flowchart showing image selection and image processing.

FIG. 4 is a flowchart showing image selection and image processing.

When an image is to be selected to receive, transmit or reproduce the image data stored in the storage medium 54 or the external apparatus such as the server 32, the user selects an image selection mode. Then, the program for the information processing device 44 goes to S200 of "START."

Next, the program goes to S202 of "SELECT IMAGE," information on the files stored in the storage medium 54, the transmitted files, and files stored in external apparatuses that can communicate with the electronic camera 10. The file information may be a file list showing file names, etc., and it may be thumbnails recorded in the image files as shown in FIG. 5.

Figure 5:
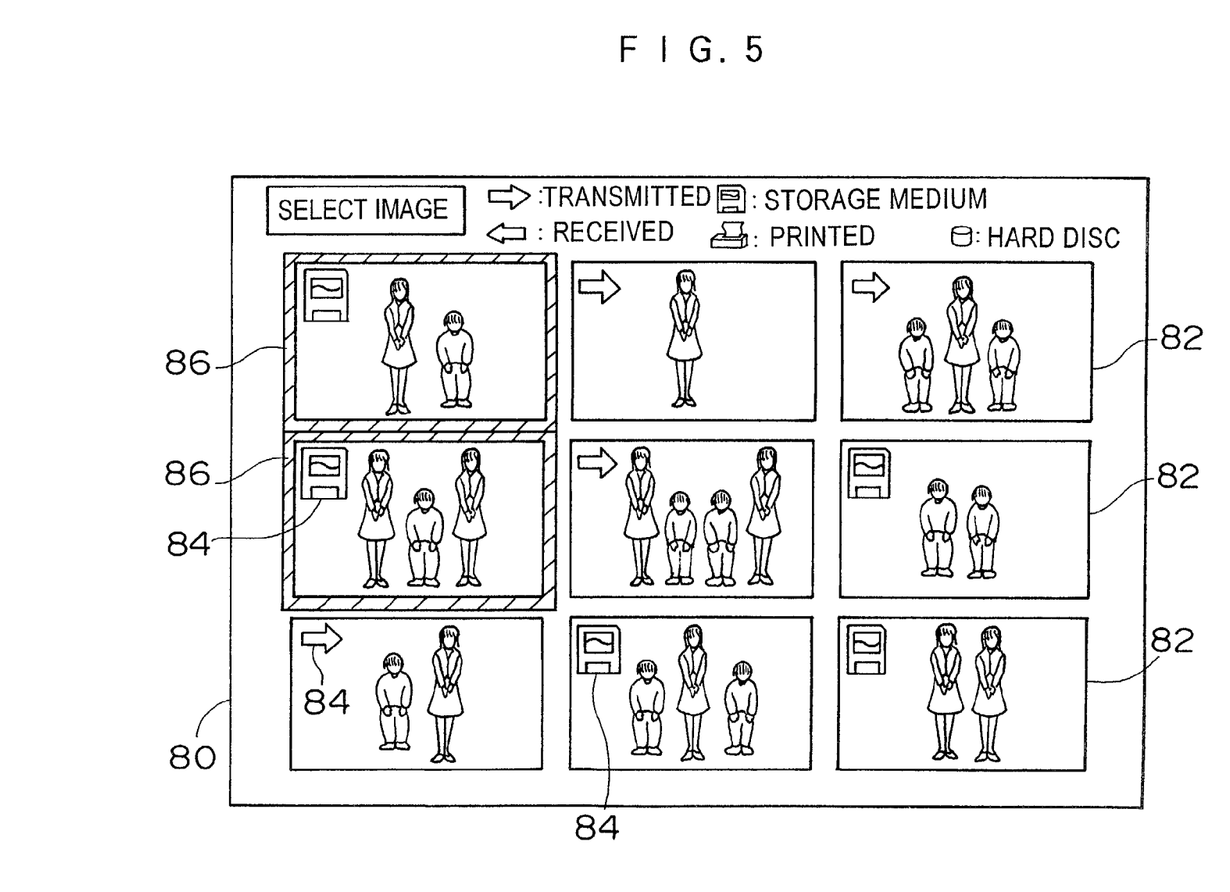
FIG. 5 is a diagram showing an image selection screen with thumbnails displayed on a display.

FIG. 5 shows an image selection screen 80 with the thumbnails displayed on the display 16.

On the image selection screen 80, the thumbnails 82, "TRANSMITTED," "PRINTED," "HARD DISC," "STORAGE MEDIUM," and "RECEIVED" marks 84 on the thumbnails 82 that indicate where the main image data is stored or where it has been transmitted to, and selection frames 86 that enclose thumbnails 82 for selected images are displayed. Characters or frames in different colors or shapes may be displayed instead of the marks 84.

At S202, the user selects one or more images with reference to the thumbnails 82 on the display 16 with the input device 50. Then, the program goes to S204 of "IMAGE DATA IS IN STORAGE MEDIUM?" If the image data of one of the images is not stored in the storage medium 54 of the electronic camera 10, then the program goes to S206 of "RECEIVE IMAGE DATA?"

If the user selects two or more image files at S202, a transmission information file may be produced for the subsequent processing.

Figure 6:
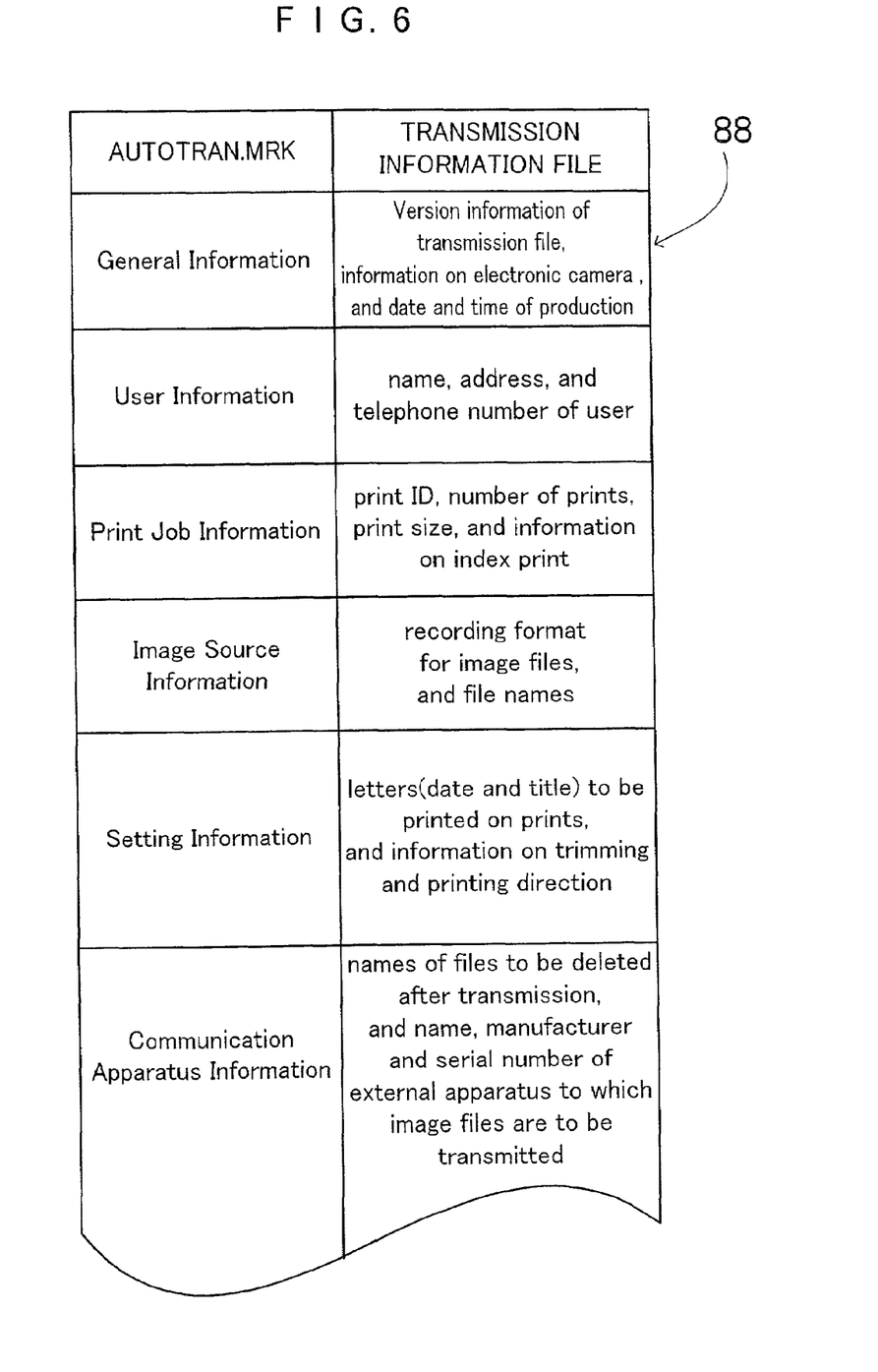
FIG. 6 is a diagram showing a transmission information file.

FIG. 6 shows the transmission information file 88.

The transmission information file 88 indicates general information, user information, print job information, image source information, setting information, communication apparatus information, etc. The general information includes version information of the transmission file 88, information on the electronic camera, and the date and time of the production. The user information includes the name, address, telephone number, etc. of the user. The print job information includes a print ID, the number of prints, the print size, and the information on an index print. The image source information includes a recording format for the image files, and file names. The setting information includes letters (the date, the title, etc.) to be printed on the prints, and information on trimming and printing direction. The communication apparatus information includes names of the files to be deleted from the storage medium after the transmission, and the name, the manufacturer and the serial number of the external apparatus to which the image files are to be transmitted. The information processing device 44 reads the transmission information file 88, and transmits the image files to the external apparatuses. The transmission information file 88 may be deleted when the transmission or printing is finished, and it may be stored in the storage medium 54.

At S206, it is determined whether or not the user wants to receive the image file. If yes, the server 32 is informed of the file name at S208 of "ACCESS SERVER."

Then, at S210 of "RECEIVE IMAGE FILES," the electronic camera 10 receives the image file from the server 32 through the antenna 62 and the transmitting and receiving device 60. The electronic camera 10 stores the image file in the storage medium 54, and decompresses the compressed image data with the compressing and decompressing device 52 and temporarily stores the decompressed image data in the frame memory 48. The image data is then transmitted to the D/A converter, and the main image is displayed on the display 16. The display 16 may display a message that the image file is being received at S210. The information that the image file has been received is added to the thumbnail data of the received image file. An indicator indicating that the image file has been received from the server 32 may be added to the file name, and information indicating that may be added to the tag information of the image file. If a transmitted image file is received and stored in the storage medium 54 again, the file name and the tag information indicating that the image file has been transmitted may be replaced by the original tag information before the transmission.

Next, at S212 of "INFORMATION INDICATING THAT THE IMAGE FILE HAS BEEN STORED," the information processing device 44 adds information indicating that the image file has been stored in the storage medium 54 to the tag information of the image file. After that, the program goes to S214 of "RETURN TO IMAGE SELECTION SCREEN." If the user does not want to receive the image file at S206, the program goes to S214.

If the image file is not stored in the storage medium 54 at S204, the program goes to S216 of "REPRODUCE MAIN IMAGE?" If the user wants to reproduce the main image, the program goes to S218 of "REPRODUCE MAIN IMAGE."

Figure 7:
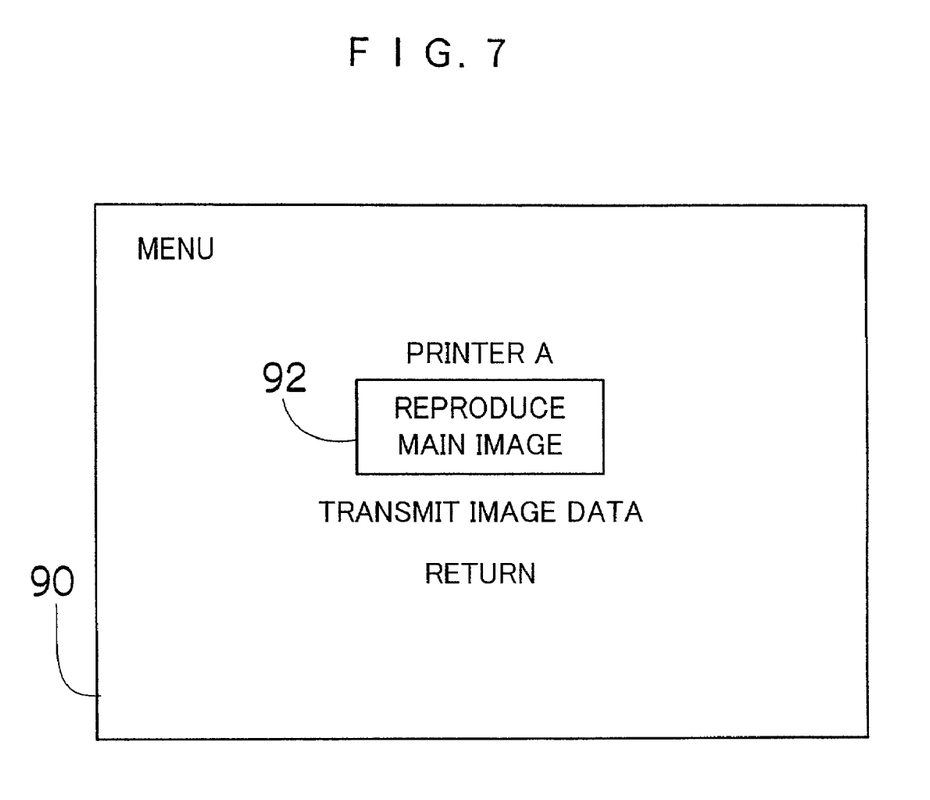
FIG. 7 is a diagram showing a menu screen for selecting reproduction of a main image.

FIG. 7 shows a menu screen 90 for selecting reproduction of the main image.

On the menu screen 90, modes "PRINTER A," "REPRODUCE MAIN IMAGE," "TRANSMIT IMAGE DATA," and "RETURN." In the mode "PRINTER A," image data is transmitted to a printer A to print the main image with the printer A. In the mode "REPRODUCE MAIN IMAGE," the main image is reproduced. In the mode "TRANSMIT IMAGE DATA," the image data is transmitted to the external apparatus. In the mode "RETURN," the image selection screen 80 is displayed again. The user moves a cursor 92 to select one of the modes.

Figure 8:
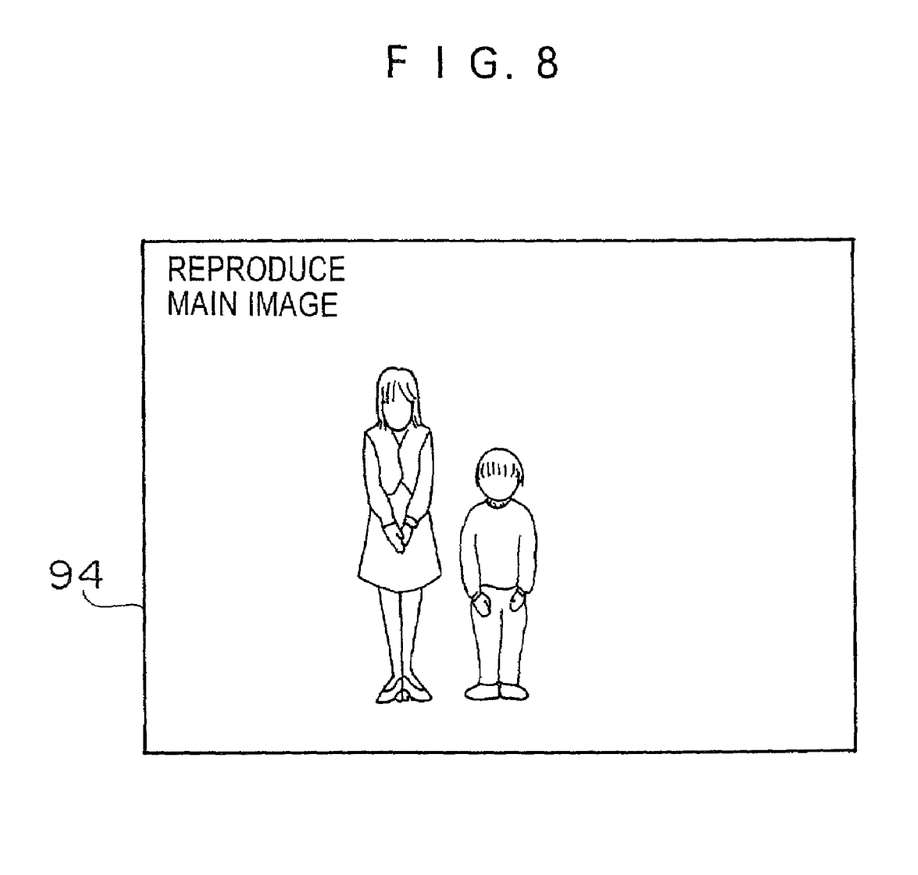
FIG. 8 is a diagram showing the main image displayed on the display.

If the user selects the mode "REPRODUCE MAIN IMAGE," the storage medium interface 56 reads desired image data from the storage medium 54, and the compressing and decompressing device 52 decompresses the compressed image data, and the decompressed image data is temporarily stored in the frame memory 48. The image data is transmitted to the D/A converter, and the main image 94 is displayed on the display 16 as shown in FIG. 8. Then, the program goes to step S214.

If the user does not want to reproduce the main image at S216, the program goes to S220 of "TRANSMIT IMAGE FILE?" If the user wants to transmit the image file to the external apparatus such as the server 32, the program goes to S222 of "TRANSMIT IMAGE FILE." At S222, the electronic camera 10 communicates with the external apparatus to transmit the image file to the external apparatus. At this time, the display 16 displays a message that the image file is being transmitted to the external apparatus.

After the transmission, at S224 of "INFORMATION THAT IMAGE FILE HAS BEEN TRANSMITTED," the information processing device 44 adds information that the image file has been transmitted to the tag information of the image file stored in the storage medium 54, and the information is added to the thumbnail data. If the user has set erasure of the main image data, the main image data is deleted and the thumbnail data is kept after the transmission.

If the user has not set the erasure of the main image data (the user has set protection for the main image data), the main image data is kept with the thumbnail data. An indicator indicating that the image file has been transmitted may be added to the file name, and information indicating that may be added to the tag information of the image file. After that, the program goes to S214. If the user does not want to transmit the image file (selects the mode "RETURN") at S220, then the program goes to S214.

At S214 of "RETURN TO IMAGE SELECTION SCREEN," the image selection screen 80 is displayed on the display 16 again, and the program goes to S226 of "NEXT IMAGE?" At S226, it is determined whether image data of any selected image has not been transmitted or received or any selected image has not been reproduced. If any of the selected images has not been dealt with, the program goes to S228 of "NEXT IMAGE" and goes back to S204 to deal with the next image. If all the selected images have been dealt with at S226, the program goes to S230 to finish the processing.

Figure 9:
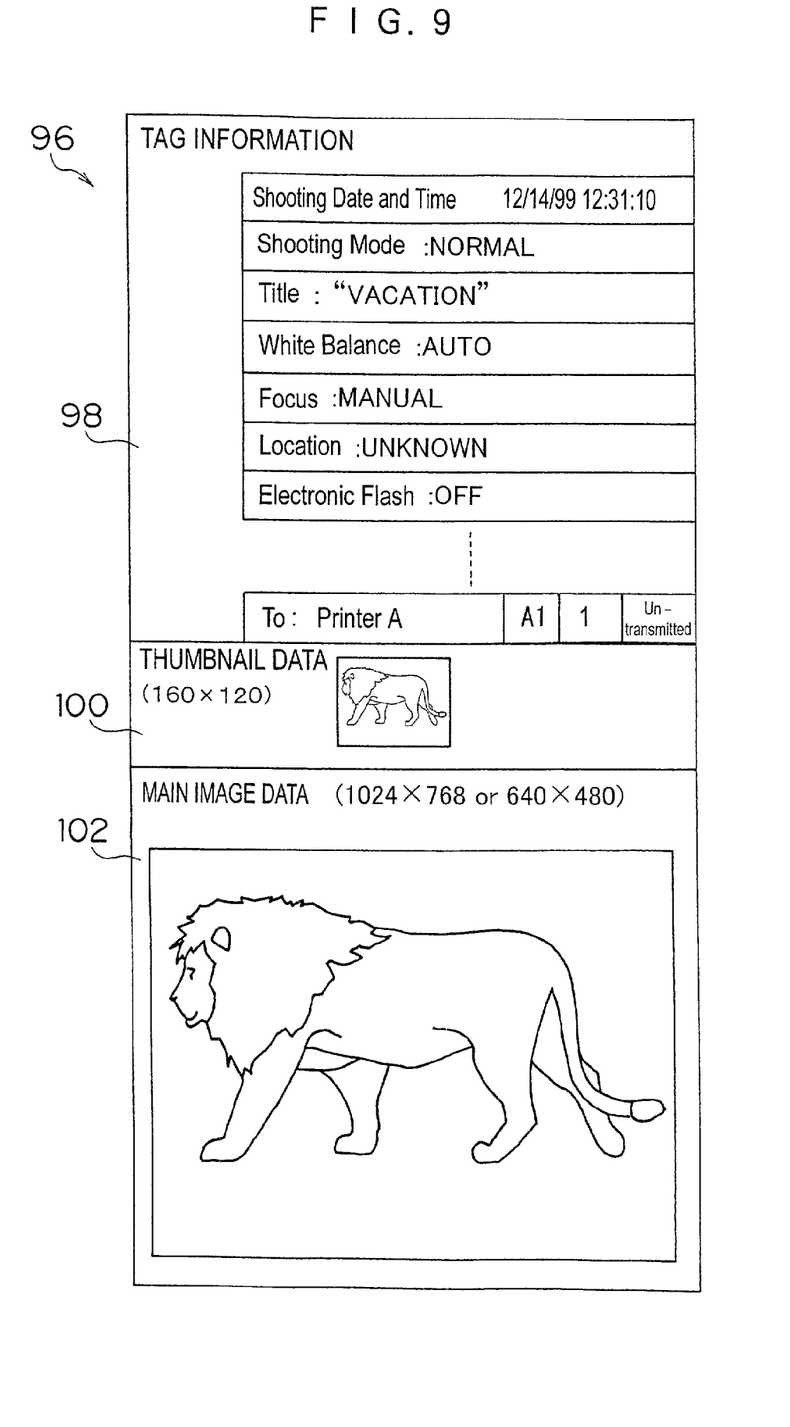
FIG. 9 is a diagram showing a structure of an image file.

FIG. 9 shows a structure of an image file 96.

The image file 96 is composed of a tag information area 98 for information such as the shooting date and time, the shooting mode, and the title; a thumbnail data area 100 for the thumbnail data; and a main image data area 102 for the main image data.

If the image file 96 is transmitted to the external apparatus, the information processing device 44 deletes the main image data, and information that the image file has been transmitted is added to the tag information, and the information is added to the thumbnail data.

Figure 10:
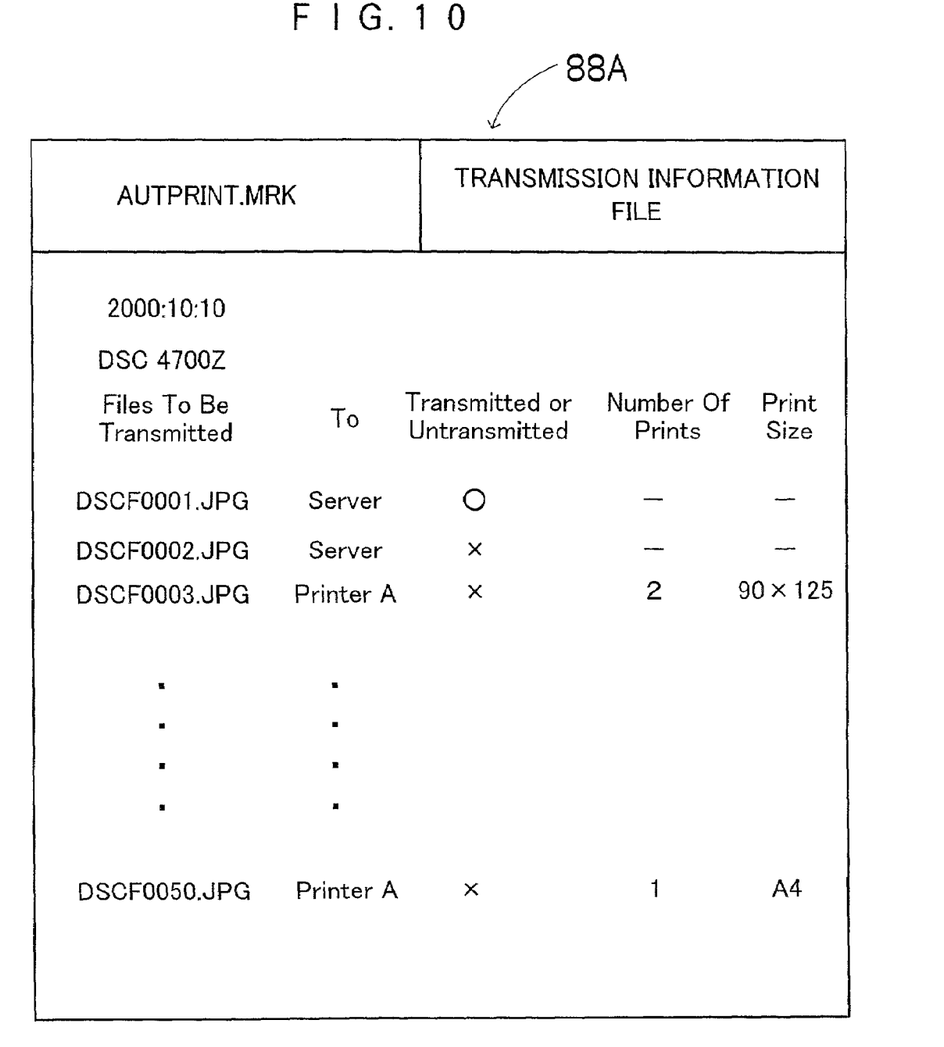
FIG. 10 is a diagram showing another transmission information file.

FIG. 10 shows another transmission information file 88A.

The transmission information file 88A indicates the file names, where the image files are to be transmitted to or have been transmitted to, whether or not the image files have been transmitted, the number of prints of each image, and the print sizes. The information processing device 44 reads the transmission information file 88A, and transmits the image files to the external apparatuses.

As mentioned above, the image data transmitting device of the present invention comprises the communication device that transmits the main image data stored in the storage medium to the external apparatus; and the information processing device that deletes the main image data stored in the storage medium after the communication device transmits it, and produces the reduced image data of the main image data and stores the reduced image data in the storage medium or keeps the reduced image data stored in the storage medium. This makes it easy for the user to recognize the image after the main image data is transmitted.

In the above-described embodiments, "deletion" or "erasure" of data from a medium is not restricted to complete deletion or erasure of the data from the medium. When the data is "deleted" or "erased" from a memory area of the medium, the memory area does not have to become empty while the data is made inaccessible by rewriting a file allocation table of the medium, for example.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image data transmitting device, comprising:
   an information processing device that creates a reduced image data based on a subject main image data by reducing the subject main image data, and stores an image file including the subject main image data and the reduced image data in a storage medium; and
   a communication device that transmits the image file stored in the storage medium to an external apparatus,
   wherein the information processing device deletes from the image file in the storage medium the subject main image data after the communication device transmits the image file, and keeps the reduced image data of the image file after the subject main image data is deleted, and
   wherein the information processing device adds information to the reduced image data, the added information indicating the main image data has been transmitted, the added information identifying the external apparatus to which the main image has been transmitted, or the added information indicating the main image data has be stored, the added information identifying a location of the storage;
   wherein the image data transmitting device requests the transmitted main image data from the external apparatus and receives the main image data from the external apparatus; and
   wherein information regarding the received main image data is added to the reduced image data.

2. The image data transmitting device as defined in claim 1, further comprising:
   a first setting device with which a user sets erasure of the main image data stored in the storage medium,
   wherein the information processing device deletes the main image data after the communication device transmits the main image data to the external apparatus only if the user sets the erasure of the main image data.

3. The image data transmitting device as defined in claim 1, further comprising a second setting device with which the user sets the external apparatus.

4. The image data transmitting device as defined in claim 1, wherein the communication device automatically transmits the main image data to the external apparatus when the communication device becomes able to communicate with the external apparatus.

5. The image data transmitting device as defined in claim 1, wherein the information processing device adds an indicator indicating that the main image data has been transmitted to a file name of a file of the main image data transmitted.

6. The image data transmitting device as defined in claim 1, wherein the information processing device adds information that the main image data has been transmitted to attached information of a file of the main image data transmitted.

7. The image data transmitting device as defined in claim 6, further comprising a first displaying device that displays a reduced image with at least one of information that the main image data has been transmitted, and information indicating the external apparatus.

8. The image data transmitting device as defined in claim 6, further comprising:
   a third setting device with which the user sets reception of the main image data according to the reduced image data stored in the storage medium,
   wherein the communication device receives the main image data from the external apparatus and stores the main image data in the storage medium.

9. The image data transmitting device as defined in claim 8, wherein the information processing device replaces the information that the main image data has been transmitted to the external apparatus with information before the main image data is transmitted when the main image data transmitted is received from the external apparatus and stored in the storage medium.

10. The image data transmitting device as defined in claim 1, wherein the information processing device adds information that the main image data has been transmitted to the reduced image data to display a reduced image with at least one of a mark, a frame and characters.

11. The image data transmitting device as defined in claim 1, wherein the information processing device adds information indicating the external apparatus to which the main image data has been transmitted to the reduced image data to display a reduced image with at least one of a mark, a frame, and characters.

12. The image data transmitting device as defined in claim 1, further comprising:
  a fourth setting device with which the user sets transmission of the main image data stored in the storage medium to the external apparatus,
  wherein the information processing device produces a transmission information file that shows information set with the fourth setting device, and the communication device transmits the main image data stored in the storage medium to the external apparatus according to the information shown in the transmission information file.

13. The image data transmitting device as defined in claim 1, further comprising a second displaying device that displays a message that the main image data is being transmitted while the communication device is transmitting the main image data to the external apparatus.

14. The image data transmitting device as defined in claim 1, further comprising:
  an imaging device that captures the main image data,
  wherein the main image data is stored in the storage medium.

15. The image data transmitting device as defined in claim 1, wherein a user can set the deletion of the main image data, whereby the reduced image data is produced simultaneously with production of the main image data.

16. The image data transmitting device as defined in claim 15, further comprising:
  a first setting device with which the user sets erasure of the main image data stored in the storage medium,
  wherein the information processing device deletes the main image data after the communication device transmits the main image data to the external apparatus only if the user sets the erasure of the main image data.

17. The image data transmitting device as defined in claim 15, further comprising a second setting device with which the user sets the external apparatus.

18. The image data transmitting device as defined in claim 15, wherein the communication device automatically transmits the main image data to the external apparatus when the communication device becomes able to communicate with the external apparatus.

19. The image data transmitting device as defined in claim 15, wherein the information processing device adds an indicator indicating that the main image data has been transmitted to a file name of a file of the main image data transmitted.

20. The image data transmitting device as defined in claim 15, wherein the information processing device adds information that the main image data has been transmitted to attached information of a file of the main image data transmitted.

21. The image data transmitting device as defined in claim 20, further comprising a first displaying device that displays a reduced image with at least one of information that the main image data has been transmitted, and information indicating the external apparatus.

22. The image data transmitting device as defined in claim 20, further comprising:
  a third setting device with which the user sets reception of the main image data according to the reduced image data stored in the storage medium,
  wherein the communication device receives the main image data from the external apparatus and stores the main image data in the storage medium.

23. The image data transmitting device as defined in claim 22, wherein the information processing device replaces the information that the main image data has been transmitted to the external apparatus with information before the main image data is transmitted when the main image data transmitted is received from the external apparatus and stored in the storage medium.

24. The image data transmitting device as defined in claim 15, wherein the information processing device adds information that the main image data has been transmitted to the reduced image data to display a reduced image with at least one of a mark, a frame and characters.

25. The image data transmitting device as defined in claim 15, wherein the information processing device adds information indicating the external apparatus to which the main image data has been transmitted to the reduced image data to display a reduced image with at least one of a mark, a frame, and characters.

26. The image data transmitting device as defined in claim 15, further comprising:
  a fourth setting device with which the user sets transmission of the main image data stored in the storage medium to the external apparatus,
  wherein the information processing device produces a transmission information file that shows information set with the fourth setting device, and the communication device transmits the main image data stored in the storage medium to the external apparatus according to the information shown in the transmission information file.

27. The image data transmitting device as defined in claim 15, further comprising a second displaying device that displays a message that the main image data is being transmitted while the communication device is transmitting the main image data to the external apparatus.

28. The image data transmitting device as defined in claim 15, further comprising:
  an imaging device that captures the main image data,
  wherein the main image data is stored in the storage medium.

29. The image data transmitting device as defined in claim 1,
  wherein after the image file is transmitted, if a write-protect is set to the image file, the information processing device writes in the image file tag information showing the image file transmission is completed and keeps the subject main image data and the reduced image data in the image file.

30. An image data transmitting method, comprising the steps of:
  creating a reduced image data based on a subject main image data based on a subject main image data by reducing the subject main image data;
  storing an image file including the subject main image data and the reduced image data in a storage medium;

transmitting the image file stored in the storage medium to an external apparatus;

deleting from the image file in the storage medium the subject main image data after the image file is transmitted;

keeping the reduced image data of the image file after the subject main image data is deleted;

adding information to the reduced image data, the added information indicating the main image data has been transmitted and further identifying the external apparatus to which the main image data has been transmitted;

requesting the transmitted main image data from the external apparatus; and receiving the main image data from the external apparatus, wherein information regarding the received main image data is added to the reduced image data.

31. The image data transmitting method as defined in claim 30, further comprising the steps of:

setting erasure of the main image data stored in the storage medium in accordance with an operation by a user; and deleting the main image data after the main image data is transmitted to the external apparatus only if the user sets the erasure of the main image data.

32. The image data transmitting method as defined in claim 30, wherein the user sets the external apparatus.

33. The image data transmitting method as defined in claim 30, wherein the main image data is automatically transmitted to the external apparatus when communication with the external apparatus becomes possible.

34. The image data transmitting method as defined in claim 30, wherein an indicator indicating that the main image data has been transmitted is added to a file name of a file of the main image data transmitted.

35. The image data transmitting method as defined in claim 34, wherein a reduced image is displayed with at least one of information that the main image data has been transmitted, and information indicating the external apparatus.

36. The image data transmitting method as defined in claim 34, wherein:

the user sets reception of the main image data according to the reduced image data stored in the storage medium; and the main image data is received from the external apparatus and stored in the storage medium.

37. The image data transmitting method as defined in claim 36, wherein the information that the main image data has been transmitted to the external apparatus is replaced by information before the main image data is transmitted when the main image data transmitted is received from the external apparatus and stored in the storage medium.

38. The image data transmitting method as defined in claim 30, wherein information that the main image data has been transmitted is added to attached information of a file of the main image data transmitted.

39. The image data transmitting method as defined in claim 38, wherein a reduced image is displayed with at least one of information that the main image data has been transmitted, and information indicating the external apparatus.

40. The image data transmitting method as defined in claim 38, wherein:

the user sets reception of the main image data according to the reduced image data stored in the storage medium; and the main image data is received from the external apparatus and stored in the storage medium.

41. The image data transmitting method as defined in claim 40, wherein the information that the main image data has been transmitted to the external apparatus is replaced by information before the main image data is transmitted when the main image data transmitted is received from the external apparatus and stored in the storage medium.

42. The image data transmitting method as defined in claim 30, wherein information that the main image data has been transmitted is added to the reduced image data to display a reduced image with at least one of a mark, a frame and characters.

43. The image data transmitting method as defined in claim 30, wherein information indicating the external apparatus to which the main image data has been transmitted is added to the reduced image data to display a reduced image with at least one of a mark, a frame and characters.

44. The image data transmitting method as defined in claim 30, wherein:

the user sets transmission of the main image data stored in the storage medium to the external apparatus;

a transmission information file that shows set information is produced; and the main image data stored in the storage medium is transmitted to the external apparatus according to the information shown in the transmission information file.

45. The image data transmitting method as defined in claim 30, wherein a message that the main image data is being transmitted is displayed on a display while the main image data is being transmitted to the external apparatus.

46. The image data transmitting method as defined in claim 30, wherein a user can set the deletion of the main image data, whereby the reduced image data is produced simultaneously with production of the main image data.

47. The image data transmitting method as defined in claim 46, further comprising the steps of:

setting erasure of the main image data stored in the storage medium in accordance with an operation by the user; and deleting the main image data after the main image data is transmitted to the external apparatus only if the user sets the erasure of the main image data.

48. The image data transmitting method as defined in claim 46, wherein the user sets the external apparatus.

49. The image data transmitting method as defined in claim 46, wherein the main image data is automatically transmitted to the external apparatus when communication with the external apparatus becomes possible.

50. The image data transmitting method as defined in claim 46, wherein an indicator indicating that the main image data has been transmitted is added to a file name of a file of the main image data transmitted.

51. The image data transmitting method as defined in claim 50, wherein a reduced image is displayed with at least one of information that the main image data has been transmitted, and information indicating the external apparatus.

52. The image data transmitting method as defined in claim 50, wherein:

the user sets reception of the main image data according to the reduced image data stored in the storage medium; and the main image data is received from the external apparatus and stored in the storage medium.

53. The image data transmitting method as defined in claim 52, wherein the information that the main image data has been transmitted to the external apparatus is replaced by information before the main image data is transmitted when the main image data transmitted is received from the external apparatus and stored in the storage medium.

54. The image data transmitting method as defined in claim 46, wherein information that the main image data has been transmitted is added to attached information of a file of the main image data transmitted.

55. The image data transmitting method as defined in claim 54, wherein a reduced image is displayed with at least one of information that the main image data has been transmitted, and information indicating the external apparatus.

56. The image data transmitting method as defined in claim 54, wherein:
- the user sets reception of the main image data according to the reduced image data stored in the storage medium; and
- the main image data is received from the external apparatus and stored in the storage medium.

57. The image data transmitting method as defined in claim 56, wherein the information that the main image data has been transmitted to the external apparatus is replaced by information before the main image data is transmitted when the main image data transmitted is received from the external apparatus and stored in the storage medium.

58. The image data transmitting method as defined in claim 46, wherein information that the main image data has been transmitted is added to the reduced image data to display a reduced image with at least one of a mark, a frame and characters.

59. The image data transmitting method as defined in claim 46, wherein information indicating the external apparatus to which the main image data has been transmitted is added to the reduced image data to display a reduced image with at least one of a mark, a frame and characters.

60. The image data transmitting method as defined in claim 46, wherein:
- the user sets transmission of the main image data stored in the storage medium to the external apparatus;
- a transmission information file that shows set information is produced; and
- the main image data stored in the storage medium is transmitted to the external apparatus according to the information shown in the transmission information file.

61. The image data transmitting method as defined in claim 46, wherein a message that the main image data is being transmitted is displayed on a display while the main image data is being transmitted to the external apparatus.

* * * * *